(12) United States Patent
Santos

(10) Patent No.: US 8,054,609 B2
(45) Date of Patent: Nov. 8, 2011

(54) SYSTEM TO CONTROL, PROTECT AND MONITOR THE STATUS OF FORCED COOLING MOTORS FOR POWER TRANSFORMERS AND SIMILAR

(76) Inventor: Eduardo Pedrosa Santos, Atibaia/SP (BR)

( * ) Notice: Subject to any disclaimer, the term of this patent is extended or adjusted under 35 U.S.C. 154(b) by 586 days.

(21) Appl. No.: 12/089,026

(22) PCT Filed: Aug. 17, 2006

(86) PCT No.: PCT/BR2006/000167
§ 371 (c)(1),
(2), (4) Date: Jun. 27, 2008

(87) PCT Pub. No.: WO2007/038846
PCT Pub. Date: Apr. 12, 2007

(65) Prior Publication Data
US 2008/0266728 A1  Oct. 30, 2008

(30) Foreign Application Priority Data
Oct. 3, 2005  (BR) .................................... 0504296

(51) Int. Cl.
*H02K 17/32* (2006.01)
(52) U.S. Cl. .................. 361/434; 318/430; 318/400.08; 318/400.15

(58) Field of Classification Search .............. 318/34–48, 318/430–434, 400.08, 400.09, 400.15; 702/182, 702/184; 361/31, 32
See application file for complete search history.

(56) References Cited

U.S. PATENT DOCUMENTS

| | | | |
|---|---|---|---|
| 5,452,201 A * | 9/1995 | Pieronek et al. ................ 700/83 |
| 5,995,910 A * | 11/1999 | Discenzo ........................ 702/56 |
| 6,053,047 A * | 4/2000 | Dister et al. .................... 73/593 |
| 6,138,078 A * | 10/2000 | Canada et al. .................. 702/44 |
| 6,199,018 B1 * | 3/2001 | Quist et al. ...................... 702/34 |
| 6,289,735 B1 * | 9/2001 | Dister et al. .................... 73/579 |
| 6,295,510 B1 * | 9/2001 | Discenzo ...................... 702/183 |
| 6,434,512 B1 * | 8/2002 | Discenzo ...................... 702/184 |
| 6,757,665 B1 * | 6/2004 | Unsworth et al. .............. 706/15 |
| 2003/0080772 A1 * | 5/2003 | Giacomini et al. ........... 324/771 |
| 2004/0158428 A1 * | 8/2004 | Byrd et al. ..................... 702/182 |

* cited by examiner

*Primary Examiner* — Paul Ip
(74) *Attorney, Agent, or Firm* — McKee, Voorhees & Sease, P.L.C.

(57) ABSTRACT

System to control, protect and monitor the status of forced cooling motors for power transformers and similar, is preferably applied to power transformers and auto-transformers, and this system turns conventional (1) cooling motors into "intelligent" motors, operating in a totally autonomous manner, whose electronic module (2) is installed on the actual motor cover, more specifically on the connection box (3) and is interconnected by a communication network to a digital system (4) without the need to use any external control, protection and monitoring elements or exaggerated panels for functioning thereof.

17 Claims, 1 Drawing Sheet

SYSTEM TO CONTROL, PROTECT AND MONITOR THE STATUS OF FORCED COOLING MOTORS FOR POWER TRANSFORMERS AND SIMILAR

BRIEF PRESENTATION

This Invention patent application is for an innovative "SYSTEM TO CONTROL, PROTECT AND MONITOR THE STATUS OF FORCED COOLING MOTORS FOR POWER TRANSFORMERS AND SIMILAR", particularly for a system to control, protect and monitor power transformer motors and similar capable to turn a conventional motor into an "intelligent" motor, which system is based on an electronic module installed directly over the motor or motors in such a way as to integrate to said motor or motors functions required for control (on-off), protection and monitoring thereof, such being interconnected by a communication network to a computer system or digital control system, allowing remote control of the motor(s) and preserving the motor(s) against general damages, such as overloading and others without using any outside elements such as relays, circuit breakers, switches, etc. that need a control panel.

BRIEF HISTORY

The power transformers and auto-transformers are typically used in electrical power transmission and distribution systems to transfer power, and their function is to alter the output voltage level in relation to the input. In this process, there occur internal losses in the transformers that cause, among other inconveniences, temperature increases to the windings, core and insulation medium, usually some type of oil.

In practice, such temperature increases are limiting factors for obtaining the maximum power that theoretically could be transformed by the equipment, in view of the borderline temperatures supported by the materials normally used. As a result, the power transformers must be equipped with devices to dissipate the internally generated heat to the surrounding medium, thus increasing the maximum power limit that could be transformed.

These cooling devices can be classified according to the following:

Natural Cooling—Usually based on a radiator in which the heat exchange is based on natural convection between the oil contained in the transformer and the outside air.

Forced Cooling—in which the heat exchange is optimized through the circulation of cooling fluids (oil, air and others) using electric motors that activate fans and/or pumps.

The number of motors used varies according to the transformer project and may vary from one to dozens of motors.

STATE OF THE ART

In existing transformer cooling systems protection is carried out by means of a thermal protection device to each motor, which may be, as an example, a thermal relay or a thermo-magnetic circuit breaker specific to protect motors whose thermal element can be adjusted.

This type of conventional protection has the following particularities:

A directly proportional relation between the number of motors used and the number of thermal protection devices, which demand control panels suitable to the number of devices, that is, the greater this number the larger the panel.

and consequently increasing production costs and making it difficult to standardize the control project for transformers with different quantities of cooling motors.

Such thermal protection devices for motors have an adjustment for active current, above which the motor should be disconnected. Due the fact that such devices are electromechanical elements whose functioning principle is based on the deflection of bimetallic blades in which the current adjustment range is narrow, which makes mandatory the existence of various current adjustment options to be chosen in accordance with the nominal current of the motor used. In addition to the logistical difficulties and consequent cost increase and maintenance probability, such as that mentioned above, harms standardization of the control project for transformers with motors with different nominal currents.

Just as with the aforementioned protection systems, the motor control systems are carried out by means of power contactors, which is nothing more than electromagnetic devices responsible for establishing and interrupting the input to the motors. This type of control has the following particularities:

A directly proportional relation between the number of motors and the number of contactors used, requiring panels appropriate to receive the number of contactors. In addition to greater costs, this fact makes it difficult to standardize the control project for transformer with different numbers of motors, as well as making the system more susceptible to maintenance.

Activating the cooling motors is generally carried out automatically by devices that measure temperatures in the transformer, equipped with output contacts that energize the contactors' coil upon reaching the predetermined temperatures. For reasons of simplifying the control project, the motors are generally grouped into two cooling groups activated at different temperatures.

More specifically and briefly, the conventional systems used to control and protect these cooling motors should be installed in a control panel duly affixed to a the tank of the transformer to be cooled, and their thermal protection carried out by means of electromechanical devices activated by bimetallic blades installed in the aforementioned panels, with the need for various current adjustment ranges that should be made manually by a qualified professional that bases the same on the nominal current of each motor, generally numbered on its identification plate. This task is carried out without any problem when dealing with only a few motors, however, when dealing with dozens of motors it becomes difficult and slow, with possibility of occurrence of human error since its is a repetitive and manual task.

In conventional systems for control and protection of cooling motors in power transformers and similar it is necessary to use protection devices in the motors against under-loading or overloading, in addition to protections against phase failure and voltage imbalance between phases, this obviously when dealing with motors with tri-phase input, which protection disconnects the motors when one of the aforementioned events occur, avoiding burning out. Also used are protection devices that emit an alarm in the event phase inversion, which avoid that the motors rotate in the wrong direction, which will harm adequate transformer cooling. Such protection devices consists of relays specific for these functions, also installed inside the transformer control panel, which aggregates costs and occupies space and due to the greater number of components becomes more susceptible to defects and maintenance.

Also in conventional systems there is the need to use logistics based on electromechanical relay (contactors) that control the motors. As already mentioned, in conventional systems, for simplifying these logistics in the control project, the motors are grouped together, in generally two cooling groups activated by different temperatures (two).

THE NEW INVENTION

The system in question shall simplify and provide flexibility for the installation of forced cooling motors used in power transformers and auto-transformers, in order to transform a conventional electric motor into an "intelligent" motor by using an electronic module for control, protection and monitoring, affixed directly onto the motor connections box, said modules interconnected by a communication network to a computer system which allows to connect and disconnect said motor or motors, protect against damages due to mechanical or electrical overloading and monitor the conservation status of the actual motor and the mechanical load connected thereto, without using any external devices such as relays, contactors, circuit breakers, control panels, etc. Communication between the computer system and the aforementioned intelligent motors may be carried out through a serial communication port or through data transmission through the actual voltage input network for the motor.

The module also allows measurement of the current consumed by the motor through electronic circuits that digitalize this information and work it by means of specific software. It also has an automatic motor thermal protection adjustment function that avoids this manual operation.

The system also measures the voltage in each input phase in the motor and by means of firmware provides standard protection against under-loading, overloading, phase failure, etc., disconnecting the motor and signaling the occurrence.

In an innovative manner, the proposed system measures input voltages and the current consumed, all digitally by using this information to monitor the motor's status, inserting a maintenance concept based on the motor's status and not on standardized corrective and/or preventive maintenance, detecting any type of defect in its initial phase, and the monitoring of the motor's status based on a series of parameters.

Finally, the proposed system has accelerometers that are able to measure in three axes that detect any type of abnormal vibration and also rotation sensors the measure their speed.

ADVANTAGES OF THE INVENTION

Simplified installation in motors already running, as it takes advantage of the system of affixation to the connection box cover to affix the control module, in addition to allowing direct connection of the control module's output to the motor's connection terminals.

Open space on the transformer control panel, since it is no longer necessary to install contractors and thermal protection devices inside it.

Standardization of the project and construction of the transformer control panel, since there are fewer components installed inside it directly proportional to the number of motors.

Adjustment of the motor's thermal protection activation current in a broad range of values by means of firmware in the electronic module, avoiding the need for various range options to adjust the current, selected in accordance with the motor's nominal current in order to avoid logistical difficulties, maintenance difficulties and cost increases.

Standardization of the project and construction of the transformer control panel, even with the use of motors with different nominal currents.

Practicality due to the automatic thermal protection adjustment that can be consulted and manually altered by the operator or at any time through the system, when requested.

Firmware disconnects and signals a defective motor, enabling the operator to take the necessary measures.

The serial network allows data communication, the motors of which can be controlled without using contactors, and can also be automatically activated in scheduled way as the temperature increases.

Reduction in the transformer's thermal wear and tear by optimizing the use of cooling motors, activating them as necessary instead of awaiting a preestablished temperature, and then activating a group of motors.

Reduction in expenditures for electrical power employed to activate the motors, since said motors are connected one by one, according to the transformer's gradual temperature increase and not in groups as in conventional systems.

The keypad on the module allows local control of the motor for tests and maintenance, with the possibility to control only one motor independent of the others, control a given group of motors to operate simultaneously or to control all of the motors simultaneously.

The invention will be explained technically below, using the block diagram as a basis.

DETAILED DESCRIPTION

Figure 1:
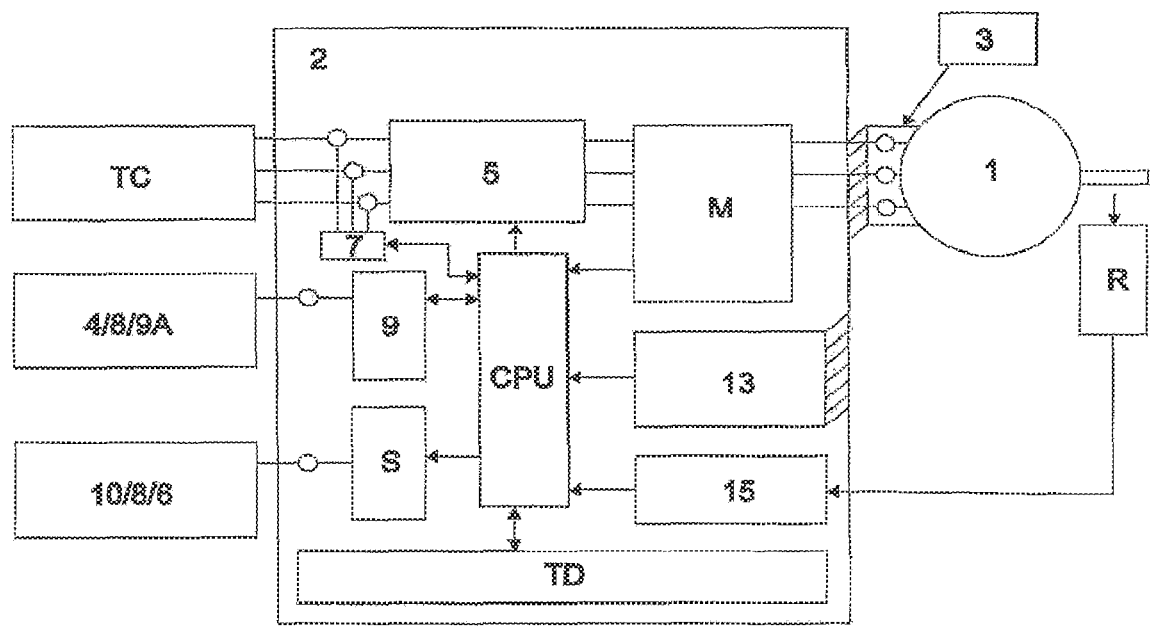
FIG. 1 is a schematic showing a system to control, protect and monitor the status of forced cooline motors for power transformers according to one embodiment of the present invention.

THE "SYSTEM TO CONTROL, PROTECT AND MONITOR THE STATUS OF FORCED COOLING MOTORS FOR POWER TRANSFORMERS AND SIMILAR, which is the object of this Invention patent application, is preferably applied to power transformers and auto-transformers, and this system transforms conventional (1) cooling motors into "intelligent" motors, operating in a totally autonomous manner, whose electronic module (2) is installed on the actual motor cover, more specifically on the connection box (3) and interconnected by a communication network to a digital system (4) without the need to use any external control, protection and monitoring elements or exaggerated panels for functioning.

Moreover, the proposed system turns a conventional electric motor (1) used to cool transformers and auto-transformers into an intelligent motor based on an electronic module (2) installed directly in the connection box (3), containing a voltage and current measurement module (M) in a CPU micro-controlled that also interacts with an interface composed of a keyboard and display (TD); connect-disconnect control (5) fed by any type of voltage and current (TC), alternating or direct, single-phase or tri-phase; serial communication (9) interconnected to a digital communication network system (4) able to connect and disconnect (5), acquire alarms (8) make measurements (9A) in the motor (1) for maintenance purposes; the CPU through output contacts (S) is able to make self-diagnosis signals (10), alarms (8) and status (6) motor connected/disconnected) preserving it against damages due to mechanical or electrical overloading. In addition to serial communication (9) the electronic module (2) also allows the receipt of commands to connect/disconnect (5) the motor (1) and send self-diagnosis signals (10), alarms (8) and the status (6) (motor connected/disconnected) through a communication interface (7) that uses as a mean of transmission the actual data from the motor input line (TC), thus allowing elimination of all additional wiring for the motor's (1) control and monitoring. The herein proposed electronic control (2) module is directly affixed to the conventional motor (1) over the connection box (3), which has a cover screwed which is removed and substituted by the electronic module (2).

Said proposed system measures (M) the current consumed by the motor (1) through the electronic circuits located in the module (2) that digitalizes this information. Thus the thermal protection (not shown) is performed digitally by specific software located in the CPU contained in the module (2). This software performs the adjustment automatically or manually by the user in the motor's (1) nominal current in a wide band of values, allowing that same module (2) to be applied in motors (1) with different nominal currents.

Another novelty in the proposed system is the automatic thermal protection adjustment function in the motors that eliminates the need for manual adjustments.

This function include a learning stage in which the control and protection system will connect the motor (1) and make the measurements (M) of the current consumed by the motor (1) during the predetermined learning time, which may be altered by the user. The thermal protection activation current adjustment is then determined together with a margin of tolerance that is also predetermined, in a percentage of the current measured over the maximum value of the current measured during the period, and the margin of tolerance may be altered by the user.

Just as mentioned above, the invented system takes measurements (M) of the voltage in each motor input phase and carries out in its firmware the protection functions against underloading, overloading, phase failure, voltage imbalance between phases and phase inversions, disconnecting the motor (1) in the event of the occurrence of any of these conditions and signaling (10) the occurrence in order for the operator to take all necessary measures.

In order to make it versatile, the claimed system has a motor control function through serial communication (9), using only a pair of wires that simply interconnect the communication ports of all motors (1) in parallel, and create a data communication network (4) through which the motors (1) may be controlled without using contactors.

The claimed system allows the motors (1) to start or stop individually through a serial communication network (9) without this implying in the involvement of complex wiring and devices. Due to this the motors (1) may be started on a scale according to the temperature gradient.

For the "in loco" control the proposed system is equipped with a keyboard and display (TD) for maintenance and testing purposes.

The measurements (M) made by the proposed system, such as those for voltages and currents during functioning, are useful for monitoring and auto-diagnosis (8) functions, and the motor (1) status monitoring is based on the following:

Calculation of the mechanical torque developed by the already running motor (1), from the active electrical power consumed and the motor rotation, measured by a rotation sensor (R) or by taking into account the motor's nominal rotation, and the power calculated from the input voltage measurements and electrical current consumed.

In the learning stage in which the protection and control system will calculate the motor (1) torque during the predetermined learning time that may be altered by the user, thus finding the minimum, average and maximum motor torque values, considering that both this and its mechanical load (fan, oil pump, etc.) are in good working order.

Determination of the alarm (8) value per torque in a high speed, adding together the predetermined margin of tolerance percentage to the maximum torque working value measured in the learning period. The alarm (8) per high torque allows detection of mechanical overload in the motor (1), for example, due to lack of lubrication, a pump with an obstructed oil flow or other reasons.

Determination of the alarm (8) value per low-speed torque, subtracting a predetermined margin of tolerance percentage from the minimum working torque value measured during the learning period. The alarm (8) per low-speed torque allows detection of low mechanical load in the motor (1), for example, due to broken fan blades, breakage in the mechanical connection between the motor and its load and for other reasons.

Determining the tendency of evolution (increase or decrease) of the torque developed by the motor (1) in a long term basis, emitting an alarm (8) in case the calculated tendency reaches maximum and minimum value programmed by the operator, respectively. The alarm (8) per tendency of evolution of the torque allows detection of defects in motor (1) evolution or in its mechanical load still in the initial stage, even before the torque reaches the alarm values per high or low torque.

Calculation of the mechanical torque developed by the motor (1) during its start up, from the active electrical power consumed and the motor (1) rotation, measured by a rotation sensor (R) or taking into account the motor's (1) nominal rotation, and the power calculated from the input voltage measurements and electrical current consumed.

A learning stage in which the protection and control system will calculate the motor's (1) start up torque during a number of predetermined start ups that may be altered by the user, thus determining the minimum, average and maximum motor torque value, taking into account that both this as well as its mechanical load (fan, oil pump, etc.) are in good working order.

Determination of the alarm (8) value per high start up torque, adding the predetermined margin of tolerance percentage to the maximum start up torque value measured during the learning period. The alarm (8) per high torque allows detection of mechanical overload in the motor (1), for example, due to lack of lubrication, obstructed oil flow in the pump or other reasons.

Determination of the alarm (8) value per low start up torque, subtracting the predetermined margin of tolerance percentage from the maximum start up torque value measured during the learning period. The alarm (8) per low torque allows detection of mechanical underload in the motor, for example, due to broken fan blades, breakage in the mechanical connection between the motor and its load and for other reasons.

Determining the tendency of evolution (increase or decrease) of the torque developed by the motor (1) after working for a long time, emitting an alarm (8) in case the calculated tendency reaches maximum and minimum values programmed by the operator, respectively. The alarm (8) per tendency of evolution of the torque allows detection of defects in motor (1) evolution or in its mechanical load still in the initial stage, even before the torque reaches the alarm values per high or low torque.

If so desired, the alarm (8) values per high or low torque obtained by automatic adjustment may be consulted and manually altered by the operator.

The automatic alarm (8) adjustments per high or low torque may be redone at any time by the system when requested by the operator.

The control and protection system proposed herein has accelerometer (13) incorporated that are able to measure accelerations in the orthogonal axes due to motor (1) vibrations, allowing the now "intelligent" motor to have incorporated, in a novel manner, the monitoring of its status by measuring vibrations in such a way that said motor (1) is able to detect and emit alarms (8) due to excessive vibrations caused for example, by unbalances fan blades, defective bearing or other reasons.

As mentioned above, the proposed system has incorporated a sensor for rotations (R) per minute that is able to measure the motor's rotation speed, enabling the now "intelligent" motor (1) to have incorporated, in a novel manner, the monitoring of its status by measuring its rotation (15) speed.

Finally, the herein proposed control and protection system can be applied to other equipment that uses electric motors (1), not only to power transformers, whether these motors function for cooling purposes or for any other functions.

The invention claimed is:

1. A system to control, protect and monitor the status of forced cooling motors for power transformers, reactors, and other electrical devices, wherein:

an electronic module (2) is installed directly in the a connection box (3) of an electric motor (1) with the electronic module (2) replacing an original cover of the connection box (3):

the electronic module (2) contains a circuit for on-off control (5) of the motor (1), which can be powered by any values of voltage and current (CT): such electronic module (2) has serial communication interfaces (9) that are interconnected to a communication network with an existing digital, system (4), allowing the digital system (4) to send commands to turn-on or turn-off the motor (1) to a CPU microcontroller (CPU), which then turns the motor on or off (1) through the control circuit (5):

the electronic module (2) contains a voltage and current measurement module (M) in the CPU that transmits to the CPU the measurements of motor voltage and current, allowing the CPU to calculate the torque developed by the motor (1) during starting and under steady conditions, to perform thermal protection of the motor (1) preserving it from damage due to mechanical or electrical overload, and to inform the existing digital system (4), through communication interfaces (9), of an occurrence of an abnormal alarm (8), a condition of the motor (1) as on or off, and of a self-diagnostic condition (9A):

the CPU also interacts with an interface composed of a keyboard and display (TD), through which the user can check the alarms and measurements of the motor (1) for maintenance purposes;

the CPU also contains output contacts (S) that allow it to make self-diagnosis signals (10), including alarms (8) and status (6) of the motor (1) as connected/disconnected to preserve it against damages due to mechanical or electrical overloading;

the electronic module (2) also contains accelerometers (13) for measuring vibration of the motor (1) in three orthogonal axes allowing the CPU to perform vibration monitoring of the motor (1) and issue alarms (8) for excessive vibration: and the electronic module (2) also contains a sensor for revolutions per minute (R), which allows the CPU to measure through the measurement. circuit (15) the rotational speed of the motor (1), allowing the CPU to monitor the condition of the motor (1) based on its speed.

2. A system to control, protect and monitor the status of forced cooling motors for power transformers, reactors, and other electrical devices, according to claim 1, wherein the CPU has an automatic thermal protection adjustment function comprising a learning stage in which the control (5) will turn-on the motor (1) and make the measurements (M) of the current consumed by the motor (1) during a predetermined learning time, which may be altered by the user.

3. A system to control, protect and monitor the status of forced cooling motors for power transformers, reactors, and other electrical devices, according to claim 2, wherein an automatic thermal protection activation current adjustment is determined by adding together the margin of tolerance that is also predetermined, in a percentage of the current measured over the maximum value of the current measured during the period, and the margin of tolerance may be altered by the user.

4. A system to control, protect and monitor the status of forced cooling motors for power transformers, reactors, and other electrical devices, according to claim 3, wherein a system measures (M) the voltage in each motor input phase and carries out in its firmware the protection functions against underloading, overloading, phase failure, voltage imbalance between phases and phase inversions, disconnecting the motor (1) in the event of the occurrence of any of these conditions and signaling (10) the occurrence in order for the operator to take all necessary measures.

5. A system to control, protect and monitor the status of forced cooling motors for power transformers, reactors, and other electrical devices, according to claim 1, wherein the motor (1) condition monitoring is performed by calculating the mechanical torque developed by the motor (1)—in a steady state condition based on active electrical power consumed and the motor rotation speed, measured by a rotation sensor (R) or by taking into account the motor's nominal rotation, and the power being calculated from the input voltage and electrical current consumed measurements (M).

6. A system to control, protect and monitor the status of forced cooling motors for power transformers, reactors, and other electrical devices, according to claim 5, wherein the learning stage in which the protection and control system will calculate the motor (1) working torque during the predetermined learning time that may be altered by the user, thus finding the minimum, average and maximum motor torque values, considering that both this and its mechanical load (fan, oil pump, etc.) are in good working order.

7. A system to control, protect and monitor the status of forced cooling motors for power transformers, reactors, and other electrical devices, according to claim 6, wherein the automatic determination of the alarm (8) value per high torque, adding together the predetermined margin of tolerance percentage to the maximum torque working value measured in the learning period.

8. A system to control, protect and monitor the status of forced cooling motors for power transformers, reactors, and other electrical devices, according to claim 7, wherein the alarm values (8) per high or low torque obtained by automatic adjustment may be consulted and manually altered by the operator.

9. A system to control, protect and monitor the status of forced cooling motors for power transformers, reactors, and other electrical devices, according to claim 6, wherein automatic alarm (8) adjustments per high or low torque may be redone at any time by the system when requested by the operator.

10. A system to control, protect and monitor the status of forced cooling motors for power transformers, reactors, and other electrical devices, according to claim 1, wherein an alarm (8) per high torque allows detection of mechanical overload in the motor (1) due to lack of lubrication, a pump with an obstructed oil flow or other reasons.

11. A system to control, protect and monitor the status of forced cooling motors for power transformers, reactors, and other electrical devices, according to claim 1, wherein the determination of the alarm (8) value per low torque in steady state condition is automatic, subtracting a predetermined margin of tolerance percentage from the minimum working torque value measured during the learning period: the alarm (8) per low torque allows detection of low mechanical load on the motor (1) due to broken fan blades, breakage in the mechanical connection between the motor and its load and for other reasons.

12. A system to control, protect and monitor the status of forced cooling motors for power transformers, reactors, and other electrical devices, according to claim 1, wherein calculation is performed of the tendency of evolution (increase or decrease) of the torque developed by the motor (1) in an after working for a long time, emitting an alarm (8) in case the calculated tendency reaches maximum and minimum value programmed by the operator, respectively. The alarm (8) per tendency of evolution of the torque allows detection of defects in motor (1) evolution or in its mechanical load still in the initial stage, even before the torque reaches the alarm values per high or low torque.

13. A system to control, protect and monitor the status of forced cooling motors for power transformers, reactors, and other electrical devices, according to claim 1, wherein calculation is performed of the mechanical torque developed by the motor (1) during its start up, from the active electrical power consumed and the motor (1) rotation, measured by a rotation sensor (R) or taking into account the motor's (1) nominal rotation, and the power calculated from the input voltage measurements and electrical current consumed.

14. A system to control, protect and monitor the status of forced cooling motors for power transformers, reactors, and other electrical devices, according to claim 13, wherein is determined the tendency of evolution (increase or decrease) of the torque developed by the motor (1) after working for a long time, emitted an alarm (8) in case the calculated tendency reaches maximum and minimum values programmed by the operator, respectively. The alarm (8) per tendency of evolution of the torque allows detection of defects in motor (1) evolution or in its mechanical load still in the initial stage, even before the torque reaches the alarm values per high or low torque.

15. A system to control, protect and monitor the status of forced cooling motors for power transformers, reactors, and other electrical devices, according to claim 1, wherein the protection and control system will calculate in a learning stage the motor's (1) start up torque during a number of predetermined start ups that may be altered by the user, thus determining the minimum, average and maximum motor torque value, taking into account that both this as well as its mechanical load (fan, oil pump, etc.) are in good working order.

16. A system to control, protect and monitor the status of forced cooling motors for power transformers, reactors, and other electrical devices, according to claim 1, wherein the alarm (8) value is automatically determined per high start up torque, adding a predetermined margin of tolerance percentage to a maximum start up torque value measured during a learning period: the alarm (8) per high torque allows detection of mechanical overload in the motor (1) due to lack of lubrication, obstructed oil flow in the pump or other reasons.

17. A system to control, protect and monitor the status of forced cooling motors for power transformers, reactors, and other electrical devices, according to claim 1, wherein the alarm (8) value is automatically determined per low start up torque, subtracting the predetermined margin of tolerance percentage from a maximum start up torque value measured during a learning period: the alarm (8) per low torque allows detection of low mechanical load on the motor (1) due to broken fan blades, breakage in the mechanical connection between the motor and its load and for other reasons.

* * * * *

UNITED STATES PATENT AND TRADEMARK OFFICE
CERTIFICATE OF CORRECTION

PATENT NO. : 8,054,609 B2
APPLICATION NO. : 12/089026
DATED : November 8, 2011
INVENTOR(S) : Eduardo Pedrosa Santos Page 1 of 2

It is certified that error appears in the above-identified patent and that said Letters Patent is hereby corrected as shown below:

Col. 7, Claim 1, Line 38:
DELETE after (3) ":"
ADD after (3) --;--

Col. 7, Claim 1, Line 41:
DELETE after (CT) ":"
ADD after (CT) --;--

Col. 7, Claim 1, Line 47:
DELETE after (5) ":"
ADD after (5) --;--

Col. 7, Claim 1, Line 58:
DELETE after (9A) ":"
ADD after (9A) --;--

Col. 8, Claim 1, Line 3:
ADD after axes --,--

Col. 8, Claim 1, Line 5:
DELETE after vibration ":"
ADD after vibration --;--

Col. 9, Claim 11, Line 22:
DELETE after period ":"
ADD after period --;--

Signed and Sealed this
Seventeenth Day of January, 2012

David J. Kappos
*Director of the United States Patent and Trademark Office*

Col. 10, Claim 16, Line 31:
DELETE after period ":"
ADD after period --;--

Col. 10, Claim 17, Line 40:
DELETE after period ":"
ADD after period --;--